US008943007B2

(12) United States Patent
Modha et al.

(10) Patent No.: US 8,943,007 B2
(45) Date of Patent: Jan. 27, 2015

(54) SPIKE TAGGING FOR DEBUGGING, QUERYING, AND CAUSAL ANALYSIS

(71) Applicant: International Business Machines Corporation, Armonk, NY (US)

(72) Inventors: Dharmendra S. Modha, San Jose, CA (US); Norman J. Pass, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 13/662,092

(22) Filed: Oct. 26, 2012

(65) Prior Publication Data

US 2014/0379625 A1 Dec. 25, 2014

(51) Int. Cl.
*G06N 3/02* (2006.01)

(52) U.S. Cl.
CPC ........................................ *G06N 3/02* (2013.01)
USPC ............................................................ 706/15

(58) Field of Classification Search
CPC .......... G06N 3/02; G06N 3/04; G06N 3/0445
See application file for complete search history.

(56) References Cited

U.S. PATENT DOCUMENTS

| 7,398,259 | B2 | 7/2008 | Nugent |
| 8,005,773 | B2 * | 8/2011 | Ananthanarayanan et al. | 706/15 |
| 8,250,010 | B2 | 8/2012 | Modha et al. |
| 8,250,011 | B2 | 8/2012 | Van Der Made |
| 2009/0076993 | A1 * | 3/2009 | Ananthanarayanan et al. | 706/44 |
| 2009/0287624 | A1 | 11/2009 | Rouat et al. |
| 2009/0292661 | A1 | 11/2009 | Haas |
| 2010/0299296 | A1 * | 11/2010 | Modha et al. | 706/25 |
| 2010/0299297 | A1 | 11/2010 | Breitwisch et al. |
| 2011/0137843 | A1 | 6/2011 | Poon et al. |
| 2011/0153533 | A1 | 6/2011 | Jackson et al. |
| 2011/0182349 | A1 * | 7/2011 | Ananthanarayanan et al. | 375/240.01 |
| 2012/0173471 | A1 * | 7/2012 | Ananthanarayanan et al. | 706/25 |
| 2013/0073497 | A1 * | 3/2013 | Akopyan et al. | 706/27 |
| 2013/0073499 | A1 * | 3/2013 | Izhikevich et al. | 706/27 |
| 2013/0325767 | A1 * | 12/2013 | Hunzinger | 706/16 |
| 2014/0081895 | A1 * | 3/2014 | Coenen et al. | 706/25 |

OTHER PUBLICATIONS

Mehrtash, N. et al., "Synaptic Plasticity in Spiking Neural Networks (SP2INN): A System Approach", IEEE Transactions on Neural Networks, Sep. 2003, pp. 980-992, vol. 14, No. 5, IEEE, USA.

* cited by examiner

*Primary Examiner* — Jeffrey A Gaffin
*Assistant Examiner* — Paulinho E Smith
(74) *Attorney, Agent, or Firm* — Kenneth L. Sherman, Esq.; Michael Zarrabian, Esq.; Sherman & Zarrabian LLP

(57) ABSTRACT

Embodiments of the invention relate to spike tagging for a neural network. One embodiment comprises a neural network including multiple electronic neurons and a plurality of weighted synaptic connections interconnecting the neurons. An originating neuron of the neural network generates a spike event and a message tag that includes information relating to said originating neuron. A neuron of the neural network receives a spike event and a message tag from an interconnected neuron. In response to one or more received spike events, a receiving neuron spikes and sends a message tag selected from received message tags to an interconnected neuron.

20 Claims, 6 Drawing Sheets

SPIKE TAGGING FOR DEBUGGING, QUERYING, AND CAUSAL ANALYSIS

This invention was made with Government support under HR0011-09-C-0002 awarded by Defense Advanced Research Projects Agency (DARPA). The Government has certain rights in this invention.

BACKGROUND

Embodiments of the invention relate to neuromorphic and synaptronic computation, and in particular, spike tagging for a neural network.

Neuromorphic and synaptronic computation, also referred to as artificial neural networks, are computational systems that permit electronic systems to essentially function in a manner analogous to that of biological brains. Neuromorphic and synaptronic computation do not generally utilize the traditional digital model of manipulating 0s and 1s. Instead, neuromorphic and synaptronic computation create connections between processing elements that are roughly functionally equivalent to neurons of a biological brain. Neuromorphic and synaptronic computation may comprise various electronic circuits that are modeled on biological neurons.

In biological systems, the point of contact between an axon of a neuron and a dendrite on another neuron is called a synapse, and with respect to the synapse, the two neurons are respectively called pre-synaptic and post-synaptic. The essence of our individual experiences is stored in conductance of the synapses. The synaptic conductance changes with time as a function of the relative spike times of pre-synaptic and post-synaptic neurons, as per spike-timing dependent plasticity (STDP). The STDP rule increases the conductance of a synapse if its post-synaptic neuron fires after its pre-synaptic neuron fires, and decreases the conductance of a synapse if the order of the two firings is reversed.

BRIEF SUMMARY

Embodiments of the invention relate to spike tagging for a neural network. One embodiment comprises a neural network including multiple electronic neurons and a plurality of weighted synaptic connections interconnecting the neurons. An originating neuron of the neural network generates a spike event and a message tag that includes information relating to said originating neuron. A neuron of the neural network receives a spike event and a message tag from an interconnected neuron. In response to one or more received spike events, a receiving neuron spikes and sends a message tag selected from received message tags to an interconnected neuron.

Another embodiment comprises interconnecting multiple electronic neurons and generating a spike event and a message tag for an originating neuron that spikes, wherein the message tag includes information relating to said originating neuron. For a neuron that receives a spike event and a message tag from an interconnected neuron, a message tag is selected from received message tags and sent to an interconnected neuron when said receiving neuron spikes in response to one or more received spike events.

These and other features, aspects and advantages of the present invention will become understood with reference to the following description, appended claims and accompanying figures.

DETAILED DESCRIPTION

Figure 1:
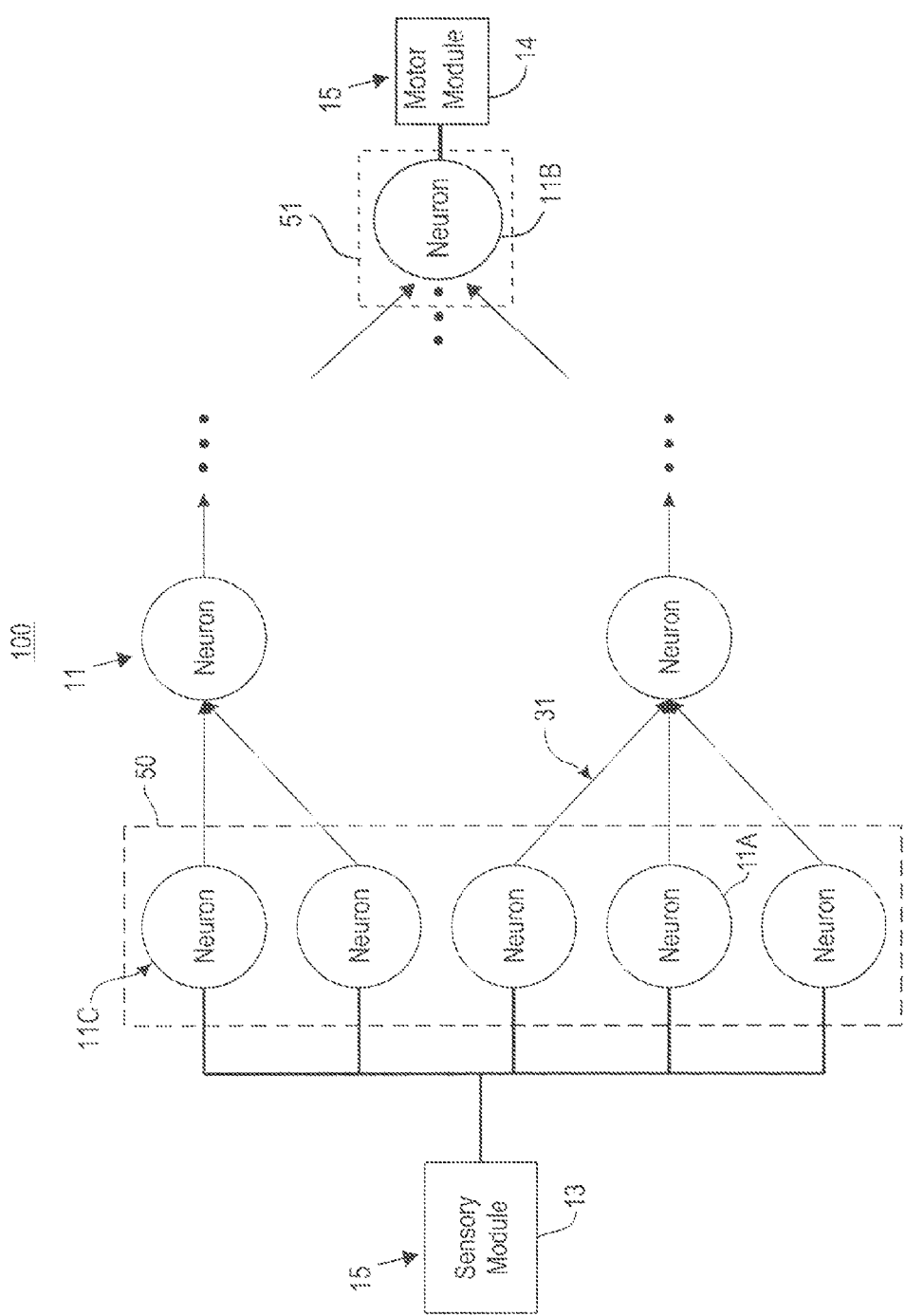
FIG. 1 illustrates a neural network, in accordance with an embodiment of the invention.

Embodiments of the invention relate to spike tagging for a neural network. One embodiment comprises a neural network including multiple electronic neurons and a plurality of weighted synaptic connections interconnecting the neurons. An originating neuron of the neural network generates a spike event and a message tag that includes information relating to said originating neuron. A neuron of the neural network receives a spike event and a message tag from an interconnected neuron. In response to one or more received spike events, a receiving neuron spikes and sends a message tag selected from received message tags to an interconnected neuron.

Another embodiment comprises interconnecting multiple electronic neurons and generating a spike event and a message tag for an originating neuron that spikes, wherein the message tag includes information relating to said originating neuron. For a neuron that receives a spike event and a message tag from an interconnected neuron, a message tag is selected from received message tags and sent to an interconnected neuron when said receiving neuron spikes in response to one or more received spike events.

Each neuron integrates incoming spike events. Each neuron spikes by generating an outgoing spike event when said integrated incoming spike events exceed a spike threshold of said neuron. Each neuron sends an outgoing spike event with a message tag, such that the spiking of said neuron is attributable to an originating neuron of the neural network.

At least one originating neuron is a sensory neuron that receives input from an external system that represents a sensory transducer. For each outgoing spike event generated by each spiking sensory neuron, said outgoing spike event is sent with a message tag that is generated by said sensory neuron.

At least one originating neuron of the neural network is an actuator neuron that provides output to an external system that represents a motor control system. For each outgoing spike event generated by each spiking actuator neuron, said outgoing spike event is sent with either a message tag that is generated by said actuator neuron or a message tag that is selected from message tags received by said actuator neuron.

For each message tag generated by each originating neuron, said message tag further includes spatial information relating to said originating neuron, temporal information relating to said originating neuron, or spatial and temporal information relating to said originating neuron. Spatial information relating to an originating neuron includes an identifier assigned to said originating neuron. Temporal information relating to an originating neuron includes a time stamp indicating when said originating neuron spiked.

Each message tag generated by an originating neuron further includes a code identifying an external system that said originating neuron corresponds to, a category relating to the input that said originating neuron receives, or a category relating to the output that said originating neuron provides.

For each outgoing spike event generated by a neuron, said outgoing spike event is sent with a message tag that is randomly selected from message tags received by said neuron.

In one embodiment, the weighted synaptic connections includes at least one forward-weighted synaptic connection configured for information flow in a first direction, and at least one backward-weighted synaptic connection configured for information flow in a direction opposite to the first direction. Each forward-weighted synaptic connection has a reciprocal backward-weighted synaptic connection. The forward-weighted synaptic connections propagate message tags originating from sensory neurons. The backward-weighted synaptic connections propagate message tags originating from actuator neurons.

The term electronic neuron as used herein represents a framework configured to simulate a biological neuron. An electronic neuron creates connections between processing elements that are roughly functionally equivalent to neurons of a biological brain. As such, a neuromorphic and synaptronic computation comprising electronic neurons according to embodiments of the invention may include various electronic circuits that are modeled on biological neurons. Further, a neuromorphic and synaptronic computation comprising electronic neurons according to embodiments of the invention may include various processing elements (including computer simulations) that are modeled on biological neurons. Although certain illustrative embodiments of the invention are described herein using electronic neurons comprising electronic circuits, the present invention is not limited to electronic circuits. A neuromorphic and synaptronic computation according to embodiments of the invention can be implemented as a neuromorphic and synaptronic framework comprising circuitry, and additionally as a computer simulation. Indeed, embodiments of the invention can take the form of an entirely hardware embodiment, an entirely software embodiment or an embodiment containing both hardware and software elements.

Tagging spike events propagating through a neural network facilitates debugging, querying, and causal analysis. Spike events tagged with spatial and/or temporal information may be examined to gain insight into the operation of a complex, highly interconnected, spatio-temporal, nonlinear system.

FIG. 1 illustrates a neural network 100, in accordance with an embodiment of the invention. The neural network 100 comprises multiple neurons 11. The neural network 100 further comprises a plurality of weighted synaptic connections 31 interconnecting the neurons 11. Each synaptic connection 31 interconnects a neuron 11 to another neuron 11.

Figure 2A:
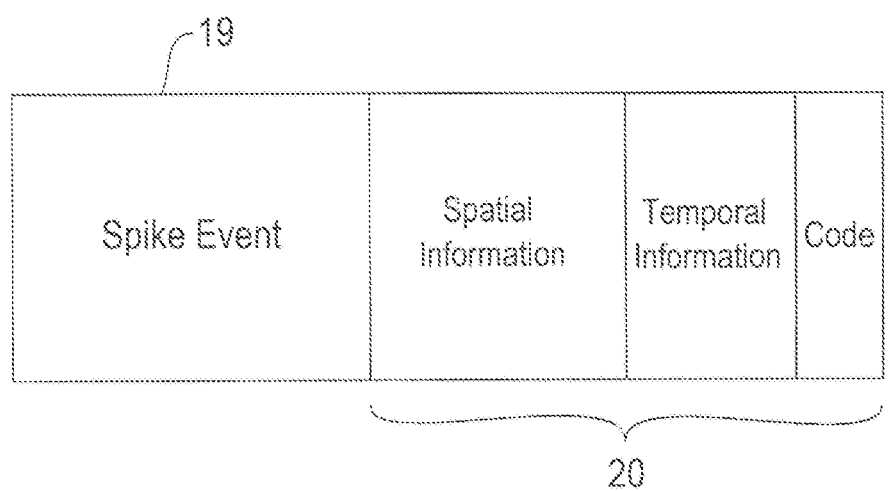
FIG. 2A illustrates an event packet, in accordance with an embodiment of the invention.

A neuron 11 spikes in response to one or more spike events 19 received. Each spiking neuron 11 generates a spike event 19 (FIG. 2A). A spiking neuron 11 sends a spike event ("outgoing spike event") 19 and a corresponding message tag 20 (FIG. 2A) to an interconnected neuron 11 via a synaptic connection 31. A neuron 11 receives a spike event ("incoming spike event") 19 and a corresponding message tag 20 from an interconnected neuron via a synaptic connection 31.

At least one neuron 11 of the neural network 100 is an originating neuron 11C. Each message tag 20 propagating through the neural network 100 originates from an originating neuron 11C that spiked. A spiking originating neuron 11C generates an outgoing spike event 19 and a corresponding message tag 20, and sends the outgoing spike event 19 and corresponding message tag 20 to an interconnected neuron. By comparison, a spiking non-originating neuron 11 generates an outgoing spike event, and sends the outgoing spike event 19 with a message tag selected from the message tags 20 that said non-originating neuron 11 received.

Spiking originating neurons 11C generate message tags 20, and spiking non-originating neurons 11 forward message tags 20. Each message tag 20 includes information relating to an originating neuron 11C that generated said message tag 20. As such, the spiking of a non-originating neuron 11 may be attributed to an originating neuron 11C by analyzing the message tag 20 that said non-originating neuron 11 forwarded.

In one embodiment, a spike event 19 and a corresponding message tag 20 are encapsulated/encoded into an event packet 30 (FIG. 2A). A neuron 11 receives an event packet 30 from an interconnected neuron 11.

Each originating neuron 11C is connected to an external system 15. In one embodiment, an originating neuron 11C may be a sensory neuron 11A or an actuator neuron 11B. Each sensory neuron 11A receives input (e.g., sensory input) from a connected sensory module 13 that represents an external system 15. A sensory module 13 may correspond to a sensory transducer that provides sensory input (e.g., eye, ear, left camera, right camera, etc.), an object (e.g., face, animal, flower), or a category of input (e.g., sound, color, good input, bad input, etc.). A sensory neuron 11A spikes in response to input received.

Each actuator neuron 11B may provide output to a motor module 14 that represents an external system 15. A motor module 14 may correspond to a motor control system that provides motor output, an object (e.g., face, animal, flower), or a category of output (e.g., sound, color, good output, bad output, etc.).

As shown in FIG. 1, the neural network 100 comprises at least one population 50 of sensory neurons 11A. Each sensory neuron 11A of the neural network 100 functions as an originating neuron 11C. In one embodiment, sensory neurons 11A are disposed at an input periphery of the neural network 100.

The neural network 100 further comprises at least one population 51 of actuator neurons 11B. An actuator neuron 11B of the neural network 100 functions as either an originating neuron 11C or a non-originating neuron 11. In one embodiment, actuator neurons 11B are disposed at an output periphery of the neural network 100.

Each synaptic connection 31 has a synaptic weight. A learning rule such as spike-timing dependent plasticity (STDP) may be applied to update the synaptic weights of the synaptic connections 31.

Figure 3:
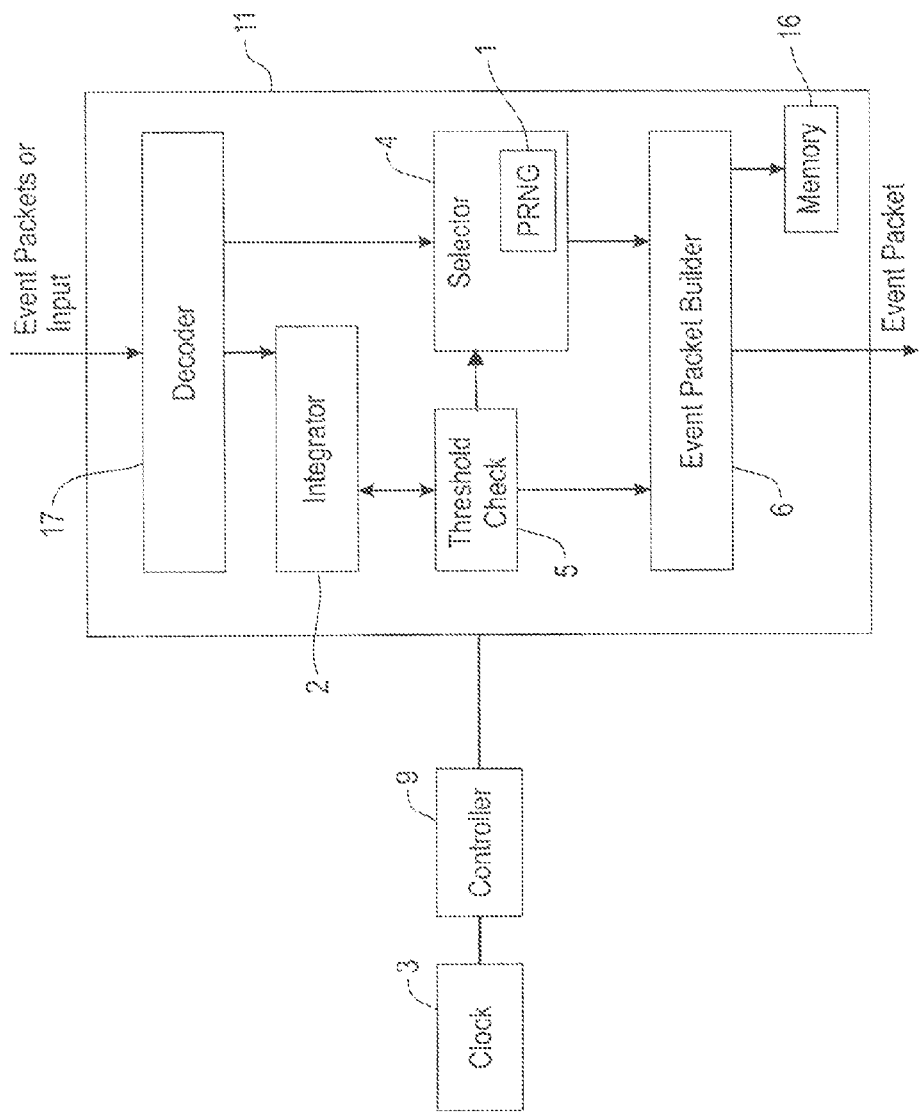
FIG. 3 is a block diagram of a neuron, in accordance with an embodiment of the invention.

The neural network 100 further comprises a controller 9 (FIG. 3) that is connected to a clock 3 (FIG. 3). The clock 3 produces clock signals used by the controller 9 to generate time steps. The controller 9 divides each time step into operational phases in the neural network 100 for neuronal updates, etc.

FIG. 2A illustrates an event packet 30, in accordance with an embodiment of the invention. A neuron 11 in the neural network 100 receives an event packet 30 from an interconnected neuron 11. An event packet 30 includes a spike event 19 and a corresponding message tag 20.

Each message tag 20 includes information relating to an originating neuron 11C that said message tag 20 originates from. Specifically, each message tag 20 includes spatial and/or temporal information relating to an originating neuron 11C that said message tag 20 originates from. In one embodiment, spatial information relating to an originating neuron 11C includes a fixed identifier assigned to said originating neuron 11C. Temporal information relating to an originating neuron 11C includes a time stamp/time step indicating when said originating neuron 11C spiked.

In one embodiment, the message tag 20 further includes additional information. For example, a message tag 20 generated by an originating neuron 11C may further include a code identifying an external system 15 (e.g., a sensory transducer, a motor control system, an object, etc.) that said originating neuron 11C corresponds to, a category of input (e.g., sound, color, good input, bad input, etc.) that said originating neuron 11C receives, or a category of output (e.g., sound, color, good output, bad output, etc.) that said originating neuron 11C provides. Example codes include "eye", "ear", "left camera", "right camera", "sound", "color", "face", "animal", "flower", "good", and "bad".

Figure 2B:
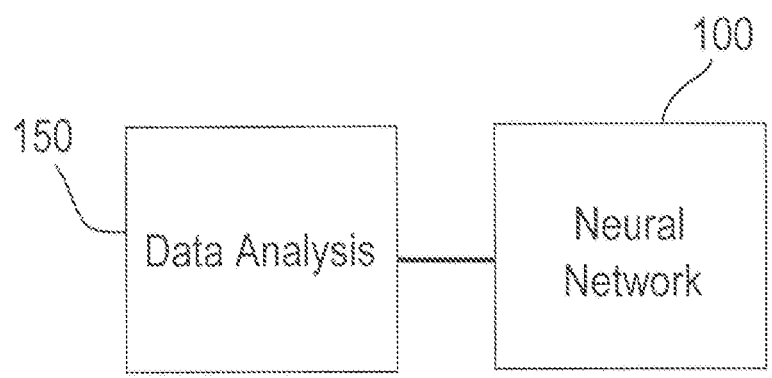
FIG. 2B illustrates block diagram of a data analysis framework for analyzing message tags, in accordance with an embodiment of the invention.

FIG. 2B illustrates block diagram of a data analysis framework 150 for analyzing message tags 20, in accordance with an embodiment of the invention. A neural network 100 may operate in conjunction with a data analysis framework 150 that monitors and analyzes message tags 20 propagating through the neural network 100. The framework 150 may be used for purposes of debugging, querying, and/or causality analysis. The framework 150 may be implemented as software.

One or more populations of neurons 11 of the neural network 100 may be analyzed at a given time or over a period of time by examining the message tags 20 forwarded by said one or more populations. The framework 150 facilitates querying/polling to determine issues such as which population of originating neurons 11C that the majority of message tags 20 originate from, the distribution of message tags 20 originating from different populations of sensory neurons 11A, etc.

The framework 150 may be used to attribute/trace the spiking of a neuron 11 (e.g., an actuator neuron 11B) to an originating neuron 11C (e.g., a sensory neuron 11A) by examining the message tag 20 that said spiking neuron 11 forwarded. Further, the framework 150 can also be used to determine the "what and when" causes contributing to the spiking of a neuron 11 by examining spatial and/or temporal information included in a message tag 20 forwarded by said neuron 11. For example, the framework 150 allows one to estimate which events in the past or which external system 15 contributed to the spiking of a neuron 11. As another example, the framework 150 allows one to estimate how different objects influence different spiking patterns.

FIG. 3 is a block diagram of a neuron 11, in accordance with an embodiment of the invention. In one embodiment, each neuron 11 comprises a decoder unit ("decoder") 17, an integrator unit ("integrator") 2, a threshold check unit ("threshold check") 5, an event packet builder unit ("event packet builder") 6, and a memory unit ("memory") 16.

The decoder 17 of each neuron 11 is configured to receive event packets 30 (FIG. 2A) from interconnected neurons 11. For each event packet 30 received, the decoder 17 records the arrival time of said event packet 30, and decodes an incoming spike event 19 (FIG. 2A) and corresponding message tag 20 (FIG. 2A) from said event packet 30. For each sensory neuron 11A, the decoder 17 of said sensory neuron 11A is further configured to receive input from a sensory module 13 (FIG. 1) representing an external system 15 (FIG. 1).

The integrator 2 of each neuron 11 is configured to integrate the incoming spike events 19 decoded by the decoder 17 of said neuron 11. Specifically, the integrator 2 integrates the incoming spike events 19 into a membrane potential variable V of the neuron 11. In one example implementation, the integrator 2 updates the membrane potential variable V once per time step. In another example implementation, the integrator 2 integrates the spike events 19 as they are received, and applies a leak rate Lk of the neuron 11 to the membrane potential variable V once per time step.

The threshold check 5 each neuron 11 is configured to determine whether the membrane potential variable V of said neuron 11 has exceeded a spike threshold Th of said neuron 11. If the membrane potential variable V exceeds the spike threshold Th, the neuron 11 spikes and the membrane potential variable V is reset.

The event packet builder 6 of each neuron 11 is configured to generate an outgoing spike event 19 when said neuron 11 spikes. The event packet builder 6 encapsulates the outgoing spike event 19 into an event packet 30 with a corresponding message tag 20. If the neuron 11 is an originating neuron 11C, the corresponding message tag 20 is generated by the event packet builder 6 of said neuron 11. If the neuron 11 is a non-originating neuron 11, the corresponding message tag 20 is a selected message tag 20.

Specifically, with the exception of sensory neurons 11A, each neuron 11 further includes a selector unit ("selector") 4. The selector 4 of a neuron 11 provides a selected message tag 20 that is selected from the message tags 20 decoded by the decoder 17 of said neuron 11.

In one embodiment, the selector 4 of a neuron 11 utilizes a pseudo-random number generator (PRNG) unit 1 to randomly select a message tag 20 received from an interconnected neuron 11 that was active within a short window of time before the neuron 11 spiked. The window of time depends on the time scale of the neuron 11, and could range from 1 to 16 milliseconds, 16 to 256 milliseconds, 256 to 4096 milliseconds, etc.

In another embodiment, the selector 4 of a neuron 11 selects a message tag 20 received from an interconnected neuron 11 with a probability that is proportional to the synaptic weight of the weighted synaptic connection 31 that interconnects the two neurons 11. In yet another embodiment, the selector 4 selects a message tag 20 received from an interconnected neuron 11 with a probability that is inversely proportional to how much time has elapsed since the interconnected neuron 11 spiked.

The memory unit 16 of each neuron 11 maintains a fixed identifier (ID) or a code assigned to said neuron 11. Each event packet 30 built by the event packet builder 6 of each neuron 11 may further include additional information, such as the fixed identifier or code maintained in the memory unit 16 of said neuron 11, and/or a time stamp/time step indicating when said neuron 11 spiked. The event packet builder 6 sends each event packet 30 it builds to interconnected neurons 11.

Figure 4:
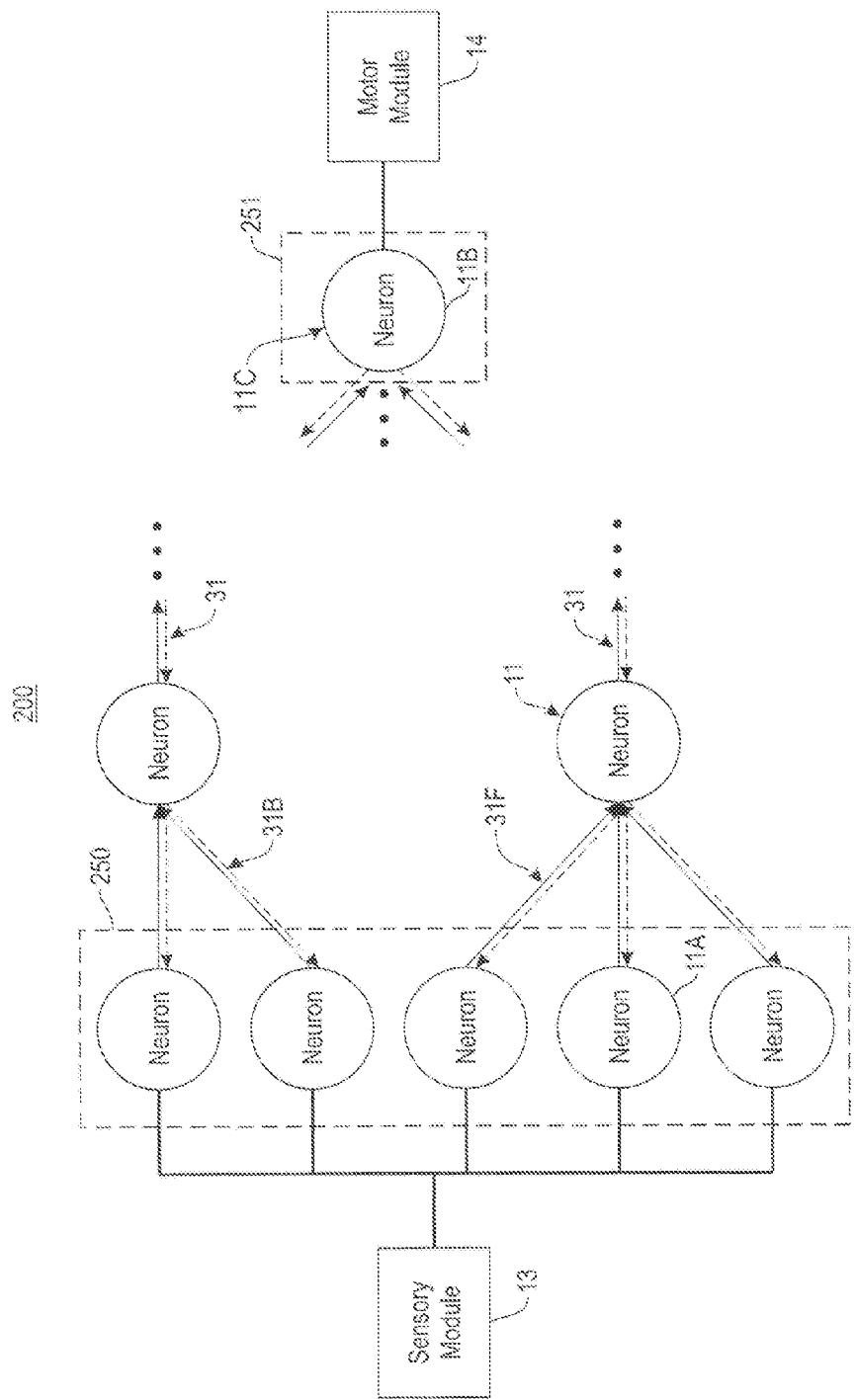
FIG. 4 illustrates a bi-directional neural network, in accordance with an embodiment of the invention.

FIG. 4 illustrates a bi-directional neural network 200, in accordance with an embodiment of the invention. The neural network 200 comprises multiple neurons 11. The neural network 200 further comprises a plurality of weighted synaptic connections 31 interconnecting the neurons 11.

As shown in FIG. 4, the neural network 200 comprises at least one population 250 of sensory neurons 11A. Each sensory neuron 11A of the neural network 200 functions as an originating neuron 11C. The neural network 200 further comprises at least one population 251 of actuator neurons 11B. An actuator neuron 11B of the neural network 200 functions as either an originating neuron 11C or a non-originating neuron 11.

Each weighted synaptic connection 31 can be classified as one of the following: a forward-weighted synaptic connection 31F configured for information flow in a first direction ("forward direction"), or a backward-weighted synaptic connection 31B configured for information flow in a direction opposite of the first direction ("backward direction"). Each forward-weighted synaptic connection 31F has a reciprocal backward-weighted synaptic connection 31B. Each forward-weighted synaptic connection 31F has the same synaptic weight as its reciprocal backward-weighted synaptic connection 31B.

Message tags 20 from sensory neurons 11A propagate through the neural network 200 in a forward direction. Message tags 20 from actuator neurons 11B propagate through the neural network 200 in a backward direction.

Figure 5:
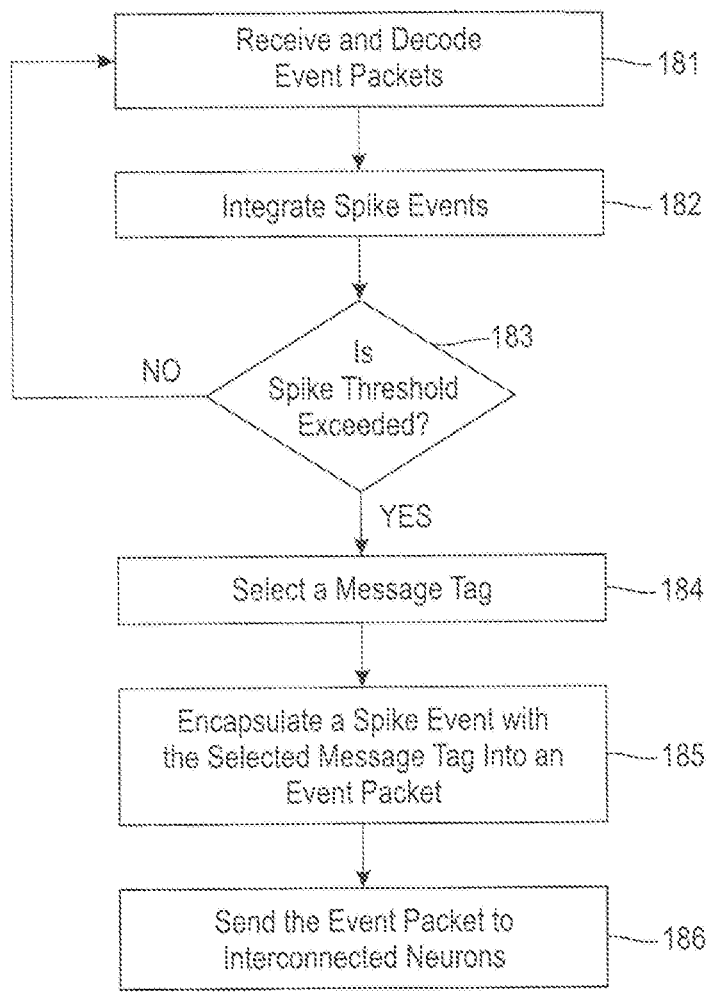
FIG. 5 illustrates a flowchart of an example process for processing event packets received by a non-originating neuron, in accordance with an embodiment of the invention.

FIG. 5 illustrates a flowchart of an example process 180 for processing event packets received by a non-originating neuron, in accordance with an embodiment of the invention. In process block 181, incoming event packets are received and decoded. In process block 182, spike events included in the event packets received are integrated. In process block 183, it is determined whether the integrated spike events exceed a spike threshold. If the spike threshold is not exceeded, return to process block 181. If the spike threshold is exceeded, proceed to process block 184 where one message tag is selected from message tags included the event packets received. In process block 185, a spike event with the selected message tag is encapsulated into an event packet. In process block 186, the event packet is sent to interconnected neurons.

Figure 6:
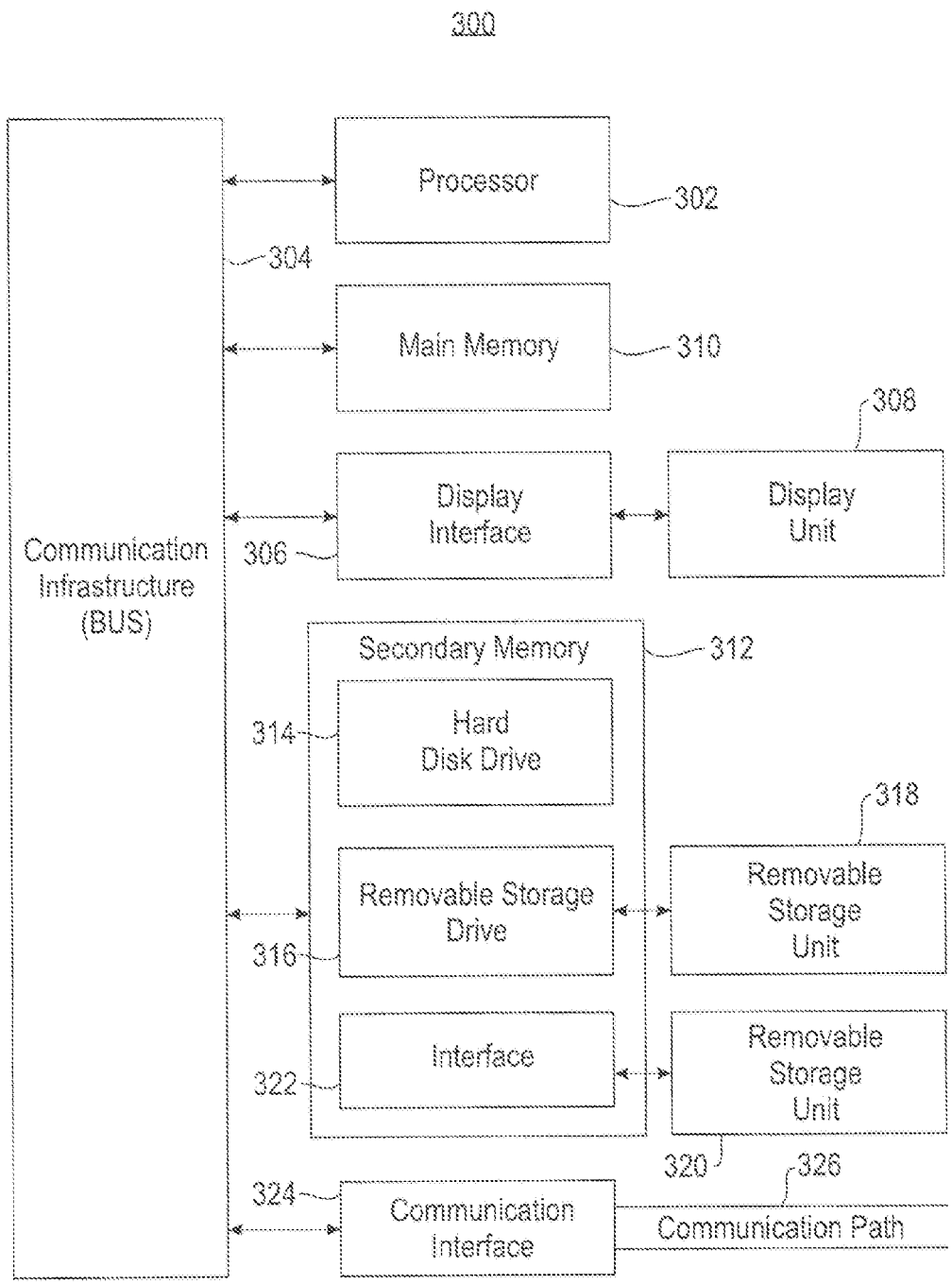
FIG. 6 is a high level block diagram showing an information processing system useful for implementing one embodiment of the invention.

FIG. 6 is a high level block diagram showing an information processing system 300 useful for implementing one embodiment of the invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

From the above description, it can be seen that the present invention provides a system, computer program product, and method for implementing the embodiments of the invention. The present invention further provides a non-transitory computer-useable storage medium for hierarchical routing and two-way information flow with structural plasticity in neural networks. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A neural network, comprising:
multiple electronic neurons; and
a plurality of weighted synaptic connections interconnecting the neurons;
wherein an originating neuron generates a spike event and a message tag that includes information relating to said originating neuron;
such that a neuron receives a spike event and a message tag from an interconnected neuron, and, in response to one or more received spike events, said receiving neuron spikes and sends a message tag selected from received message tags to an interconnected neuron.

2. The neural network of claim 1, wherein:
each neuron:
  integrates incoming spike events;
  spikes by generating an outgoing spike event when said integrated incoming spike events exceed a spike threshold of said neuron; and
  sends said outgoing spike event with a message tag, such that the spiking of said neuron is attributable to an originating neuron of the neural network.

3. The neural network of claim 2, wherein:
at least one originating neuron is a sensory neuron that receives input from an external system that represents a sensory transducer; and
for each outgoing spike event generated by each spiking sensory neuron, said outgoing spike event is sent with a message tag that is generated by said sensory neuron.

4. The neural network of claim 3, wherein:
at least one originating neuron of the neural network is an actuator neuron that provides output to an external system that represents a motor control system; and
for each outgoing spike event generated by each spiking actuator neuron, said outgoing spike event is sent with either a message tag that is generated by said actuator neuron or a message tag that is selected from message tags received by said actuator neuron.

5. The neural network of claim 4, wherein:
for each message tag generated by each originating neuron, said message tag further includes spatial information relating to said originating neuron, temporal information relating to said originating neuron, or spatial and temporal information relating to said originating neuron.

6. The neural network of claim 5, wherein:
spatial information relating to an originating neuron includes an identifier assigned to said originating neuron.

7. The neural network of claim 5, wherein:
temporal information relating to an originating neuron includes a time stamp indicating when said originating neuron spiked.

8. The neural network of claim 5, wherein:
each message tag generated by an originating neuron further includes a code identifying an external system that said originating neuron corresponds to, a category relating to the input that said originating neuron receives, or a category relating to the output that said originating neuron provides.

9. The neural network of claim 8, wherein:
for each outgoing spike event generated by a neuron, said outgoing spike event is sent with a message tag that is randomly selected from message tags received by said neuron.

10. The neural network of claim 9, wherein:
said plurality of weighted synaptic connections includes at least one forward-weighted synaptic connection configured for information flow in a first direction, and at least one backward-weighted synaptic connection configured for information flow in a direction opposite to the first direction;
wherein each forward-weighted synaptic connection has a reciprocal backward-weighted synaptic connection;
wherein said at least one forward-weighted synaptic connection propagates message tags originating from sensory neurons; and
wherein said at least one backward-weighted synaptic connection propagates message tags originating from actuator neurons.

11. A method, comprising:
interconnecting multiple electronic neurons;
generating a spike event and a message tag for an originating neuron that spikes, wherein the message tag includes information relating to said originating neuron; and
for a neuron that receives a spike event and a message tag from an interconnected neuron, selecting a message tag from received message tags and forwarding the selected message tag to an interconnected neuron when said receiving neuron spikes in response to one or more received spike events.

12. The method of claim 11, further comprising:
for each neuron:
  integrating incoming spike events;
  spiking by generating an outgoing spike event when said integrated incoming spike events exceed a spike threshold of said neuron; and
  sending said outgoing spike event with a message tag, such that the spiking of said neuron is attributable to an originating neuron of the neural network.

13. The method of claim 12, further comprising:
for at least one originating neuron:
  receiving input from an external system that represents a sensory transducer; and
  for each outgoing spike event generated by said at least one originating neuron, sending said outgoing spike event with a message tag that is generated by said at least one originating neuron.

14. The method of claim 13, further comprising:
for at least one originating neuron:
  providing output to an external system that represents a motor control system; and
  for each outgoing spike event generated by said at least one originating neuron, sending said outgoing spike event with either a message tag that is generated by said at least one originating neuron or a message tag that is selected from message tags received by said at least one originating neuron.

15. The method of claim 14, further comprising:
for each spiking originating neuron, generating a message tag that includes one or more of the following: spatial information relating to said originating neuron, temporal information relating to said originating neuron, and a code relating said originating neuron;
wherein spatial information relating to an originating neuron includes an identifier assigned to said originating neuron;

wherein temporal information relating to an originating neuron includes a time stamp indicating when said originating neuron spiked; and wherein a code relating an originating neuron identifies an external system that said originating neuron corresponds to, a category relating to the input that said originating neuron receives, or a category relating to the output that said originating neuron provides.

16. The method of claim 15, further comprising:

for each outgoing spike event generated by a neuron, randomly selecting a message tag from received message tags and sending said outgoing spike event with the selected message tag.

17. A non-transitory computer program product for a neural network comprising multiple electronic neurons that are interconnected via a plurality of weighted synaptic connections, the computer program product comprising a computer-readable storage medium having program code embodied therewith, the program code being executable by a computer to:

generate a spike event and a message tag for an originating neuron that spikes, wherein the message tag includes information relating to said originating neuron; and for a neuron that receives a spike event and a message tag from an interconnected neuron, select a message tag from received message tags and forward the selected message tag to an interconnected neuron when said receiving neuron spikes in response to one or more received spike events.

18. The program code of claim 17, further executable by the computer to:

for each neuron, integrate incoming spike events and generate an outgoing spike event when said integrated incoming spike events exceed a spike threshold of said neuron; and for each spiking neuron, send an outgoing spike event with a message tag, such that the spiking of said neuron is attributable to an originating neuron of the neural network.

19. The program code of claim 18, further executable by the computer to:

for at least one originating neuron, receive input from an external system that represents a sensory transducer.

20. The program code of claim 19, further executable by the computer to:

for at least one originating neuron, provide output to an external system that represents a motor control system.

* * * * *